United States Patent Office 3,522,296
Patented July 28, 1970

3,522,296
METHOD FOR PRODUCING CHOLINE SALTS OF ORGANIC ACIDS FROM CHOLINE CHLORIDE
Georges Nagy, Montrouge, France, assignor to Societe Anonyme Etablissements Kuhlmann, Paris, France, a corporation of France
No Drawing. Filed July 25, 1966, Ser. No. 567,380
Claims priority, application France, Apr. 26, 1966, 59,041
Int. Cl. C07c 101/00
U.S. Cl. 260—501.11     14 Claims

ABSTRACT OF THE DISCLOSURE

A method for preparing choline salts of organic acids by passing choline chloride over the hydroxyl form of a strongly basic anion resin or over the bicarbonate form of a weakly basic anion resin to obtain choline or choline bicarbonate, respectively, fixing choline or choline bicarbonate on the hydrogen form of a weakly acidic cationic resin, washing the cationic resin until the chloride ion in the effluent disappears, and eluting the choline with a corresponding organic acid.

---

This invention relates to a method of preparing choline salts of organic acids from choline chloride.

The invention relates more particularly to a method of preparing pure choline salts utilisable as pharmaceutical products from industrial choline chloride. Nevertheless it is clearly to be understood that the products described do not form part of the invention as pharmaceutical compositions or medicines, the invention relating essentially to a method of producing such products.

It is known that choline chloride is produced on an industrial scale by addition of an ethylene oxide molecule to trimethylamine hydrochloride in accordance with the following equation:

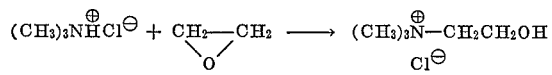

In industrial production the trimethylamine used is generally more or less pure and most frequently contains small quantities of dimethylamine and monomethylamine. These aminated impurities react with the ethylene oxide to form dimethyl-beta-hydroxyethylamine and methyl-di-beta-hydroxyethylamine. In addition, the oxyethylation reaction is never entirely complete, so that the final product always contains traces of volatile amines in the form of their hydrochlorides.

It is known that as a general rule it is possible to prepare organic salts of choline by neutralising the choline base or its carbonate by the corresponding organic acid. In principle, choline can be obtained by reacting ethylene oxide with a concentrated solution of trimethylamine, the excess of which is removed after the reaction by distillation. The choline carbonate in turn is obtained by effecting oxyethylation in the presence of carbon dioxide gas. In practice, these techniques are little used for the preparation of pure salts for pharmaceutical purposes, because of the difficulty of subsequent purification.

It is therefore desirable to utilise a method enabling the organic salts to be obtained from choline chloride. This conversion most frequently necessitates the intermediate manufacture of choline. Thus, in a known method, choline chloride is treated with alcoholic potash, the mixture is filtered to eliminate potassium chloride, and the alcoholic solution of choline is then treated with the corresponding organic acid.

Choline chloride has already been converted into choline base by passing a chloride solution over the hydroxide form of a highly basic anion exchange resin; however, in view of the fact that choline is a quaternary ammonium hydroxide, and therefore a strong base, the conversion is quantitative only in very dilute solution. At moderate concentrations, which alone are compatible with the requirement of subsequent concentration, there is a leakage of the chloride ion from the commencement of percolation over the resin, due to the regenerating effect of the choline on the latter. Up to the present time therefore this technique has permitted the preparation of pure choline free from chloride only at the expense of repeated passage over resin, which makes it very expensive for industrial manufacture.

According to the invention, a method of producing choline salts of organic acids consists in first preparing a solution of choline or choline bicarbonate, containing a small quantity of choline chloride, by respectively passing the crude choline chloride over a strongly basic anionic resin, or over the bicarbonate form of a weakly basic anionic resin, then fixing the choline on the hydrogen form of a weakly acidic cation exchange resin and, after washing said resin until the chloride ion in the effluent disappears eluting the choline with the corresponding organic acid.

For the conversion of choline chloride into choline, use is made of a strongly basic anion exchange resin of the quaternary ammonium type, in a hydroxide cycle. To this end use may be made of the resins available in commerce under the names Dowex 1 and Dowex 2 manufactured by Dow Chemical Corporation, or of the resins of the series Amberlite IRA–400, IRA–401, IRA–402 or IRA–410 manufactured by Rohm & Haas. The choline chloride solution may be more or less dilute; however, it should be noted that the chloride content of the effluent increases with its alkalinity; the higher the choline chloride concentration of the feed solution, therefore, the greater the loss of chloride. In order to reduce the loss of chloride, it is therefore advantageous to work with dilute solutions, particularly as evaporation for the purpose of concentration is eliminated in this stage in the process of the invention. In practice, choline chloride solutions having a concentration between 0.1 and 0.5 N are preferably used.

The choline obtained in this manner is passed over a weakly acidic cation exchange resin in a hydrogen cycle. The choline base is fixed on the resin, while the chloride ion contained as impurity passes through the column in the form of choline chloride and is eliminated, since a weakly acidic cationic resin is incapable of dissociating the salts of a strong acid. This operation entails the loss of a quantity of choline equivalent to the chloride content of the feed solution. This loss remains low at the dilutions applied; by way of example, it represents 3% of the total for a 0.3 N initial choline chloride solution.

Passage over a weakly acidic cationic resin has moreover the advantage of purifying the choline by eliminating the aminated impurities comprising volatile amines, such as mono-, di- and trimethylamine and fixed amines such as the amines formed by oxyethylation of the first two mentioned. All these amines are weak bases in comparison with choline. By passing an excess of solution over the cationic resin, the amines originally fixed are gradually displaced by the choline, for which the resin has a greater affinity, and they pass into the effluent.

On saturation, it is advantageous for two columns containing the weakly acidic cationic resin to be connected in series. An excess of choline is then passed over the first column; the effluent is first discarded, and then when it becomes alkaline as choline or aminated impurities pass out, it is passed to the second column. Washing with water then follows; the choline contained in the interstitial liquid of the first column is displaced and is fixed on the second column. The first column is then disconnected and washed until chloride disappears, whereupon elution is effected. At the same time an excess of choline solution is passed over the second column which is connected at the outlet to the first column which has previously been regenerated in hydrogen form.

After a certain number of cycles, the aminated impurities accumulate in the effluent, which is then discarded.

The weakly acid cationic resin preferably used comprises a resin based on acrylic acid or methacrylic acid cross-linked by divinyl benzene, such as those available on the market under the names "Amberlite IRC–50" and "Amberlite IRC–84" manufactured by Rohm & Haas, "Imac Z5" manufactured by Imacti or "Alassion CC" manufactured by Dia-Prosim. The change of volume entailed by passing from the hydrogen form to the choline form is very considerable (on saturation it is of the order of +110%); it is therefore preferable to effect percolation by an upward flow of the feed solution.

After having saturated the cationic resin with choline, it is washed by a downward flow of water until all trace of chloride in the effluent disappears, whereupon elution is effected.

As a general rule the elution is carried out with a solution of the organic acid the salt of which it is desired to obtain.

Weakly acidic resins have so marked an affinity for the hydrogen ion that any cation absorbed can be desorbed by a dilute acid solution, with a yield approaching 100%. In a dilute solution the choline can be eluted quantitatively before acidity appears in the effluent.

In the preparation of acid salts, such as for example choline bitartrate, monocholine citrate and glutamate, it is sufficient to pass the equimolecular quantity of acid over the resin saturated with choline; the effluent becomes progressively acid, but the entire eluate corresponds to the acid salt composition. In this case it is possible to work with fairly concentrated acid solutions, as high as 1 or 1.5 M.

In the case of acids which are unstable in the free state, such as pantothenic acid, or acids which are partly in the state of lactones in their aqueous solutions, such as gluconic and glucoheptonic acids, the elution is advantageously effected with a solution of an alkaline earth metal salt, preferably the calcium salt of the organic acid. Weakly acidic cationic resins have very marked selectivity for polyvalent cations, particularly for the bivalent cations the carbonate of which is only slightly soluble. In consequence of this selectivity, the leakage of calcium appears only at the moment when almost all the choline has been eluted. The fraction of eluate contaminated by leakage of calcium is then collected separately and recycled.

For the conversion of choline chloride into choline bicarbonate, use is made of a weakly basic anion exchange resin of the polyamine type. For this purpose use may be made of the resins available in commerce which are generally based on polystyrene cross-linked by divinyl benzene, such as that known under the name "Dowex 3" manufactured by Dow Chemical Corporation, or those known under the names "Amberlite IR–45" or "IRA–93" manufactured by Rohm & Haas Co.

Nevertheless use will preferably be made of a resin having a skeleton of polyacrylate cross-linked by divinyl benzene and comprising exclusively tertiary amine functional groups, such as that known under the name "Amberlite IRA–68", marketed by Rohm & Haas Co. The coefficient of selectivity of this resin for the chloride-bicarbonate ionic pair is very great, so that it is particularly suitable for the conversion of choline chloride into choline bicarbonate. The practical exchange capacity is high, while the leakage of chlorine ion is practically negligible.

The weakly basic anion exchange resin is converted into bicarbonate form by the action of a solution of carbon dioxide gas on the free amine form of the resin, preferably at a pressure of from 1 to 10 bars.

For the passage over the resin use is made of a choline chloride solution having a concentration between 0.05 N and 2 N, preferably between 0.2 N and 0.4 N. The weakly acidic cationic resin used is a copolymer of acrylic or methacrylic acid and divinyl benzene, such as those known under the names "Amberlite IRC–50" and "IRC–84," manufactured by Rohm & Haas Co., the resin available on the market under the name "Imac Z5," manufactured by Imacti, or the resin available on the market under the name "Alassion CC," manufactured by Dia-Prosim.

The choline is fixed on the resin from a choline bicarbonate solution with the formation of carbonic acid. The passage over the resin column must be effected under slight pressure in order to increase the solubility of the carbon dioxide gas in water. It is nevertheless preferable to operate in a fluidized bed, bringing into contact the cationic resin and all the choline bicarbonate solution obtained as effluent of the anionic resin, in a reactor provided at its base with a gas dispersion device, and to accelerate the liberation of carbon dioxide gas by injection of compressed air.

The cleavage of choline bicarbonate by the hydrogen form of the cationic resin is a slow reaction and the contact time must be sufficiently long, of the order of from 1 to 6 hours depending on operating conditions, in order to make maximum use of the exchange capacity of the resin. The operation is carried out at ambient temperature or optionally at moderate temperatures of the order of 20° to 50° C. in order to increase the speed of ion exchange and at the same time the speed of liberation of carbon dioxide gas. An excess or a deficiency of choline bicarbonate may be applied in relation to the practical exchange capacity of the cationic resin. In the first case, the aqueous phase is recycled and in the second case it is rejected.

In cases where the choline chloride contains aminated impurities, volatile amines such as mono-, di-, or trimethyl-amine, or fixed amines such as dimethyl-beta-hydroxyethylamine and methyl-di (beta-hydroxyethyl)amine, an excess of choline bicarbonate is used. This alternative form of the method of the invention makes it possible to eliminate aminated impurities from bases which are weak in comparison with choline. By utilizing an excess of solution in relation to the exchange capacity of the resin, the amines originally fixed are progressively displaced by the choline, for which the resin has a greater affinity, and they remain in solution. After a certain number of operations the aminated impurities accumulate in the recycled solution, which is then discarded.

The choline bicarbonate solution also contains a small quantity of choline chloride, this quantity being the greater, the higher the concentration of choline chloride feed solution on conversion into bicarbonate and the more complete the utilisation of the exchange capacity of the anionic resin. The carboxylic acid groups of the resin are incapable of cleaving choline chloride, which is a strong acid salt and consequently the choline chloride remains in aqueous solution and is thus lost as regards fixation.

After the cationic resin has been saturated with choline, it is washed until all trace of chloride in the effluent disappears, and elution is then effected in the manner previously described.

The salts of choline obtained are pure and comply with pharmaceutical requirements. These products obviously do not form part of the invention as pharmaceutical compositions or medicines.

The method of the invention is illustrated below by a description of some examples of its performance.

EXAMPLE 1

3 litres of a 0.25 N solution of choline chloride containing 104.5 g. of choline chloride, was passed at a flow-rate of 1.2 litre per hour over a column charged with 1 litre of "Amberlite IRA-400," previously converted to the hydroxide form. The first 300 ml. of the effluent were discarded. After the solution had passed, the resin was washed with 500 ml. of water; a total of 3.2 litres of choline solution containing 0.718 equivalent of OH− and 0.022 equivalent of chloride was collected.

The solution thus obtained was then passed over a column charged with 250 ml. of Amberlite IRC-50 in a hydrogen cycle, in upward flow, with a flow-rate of 1 litre per hour. The effluent was neutral and contained only a small quantity of choline chloride (about 0.007 N chloride). On completion of percolation the effluent became markedly alkaline, in consequence of the leakage of choline; this fraction was collected and recycled or passed directly to a second column connected in series with the first column.

If the impure raw material contains amines, these are aminated impurities which, displaced by choline, appear at first in the effluent. After several recyclings the impure fraction, enriched with amines, was rejected.

On conversion of the hydrogen form to the choline form, "Amberlite IRC-50" undergoes considerable swelling and its volume increases from 250 ml. to 460 ml.

The resin saturated with choline was then subjected to a back washing until the chloride ion disappeared. Washing displaced the choline contained in the interstitial liquid; the effluent was recycled or passed directly to a second column, in which the choline was fixed. On saturation, "Amberlite IRC-50" has fixed 2.3–2.4 equivalents of choline per litre of resin, measured in hydrogen form, that is to say 0.6 equivalent of choline per 250 ml.

In order to prepare choline bitartrate, 90 g. (=0.6 mol) of l-tartaric acid were dissolved in 600 ml. of water and the solution passed from top to bottom over the resin, with a rate of flow of 400 ml. per hour. The first 200 ml. of effluent were discarded; an effluent was then collected which was at first neutral and then became progressively acid, and washing was effected with 200 ml. of water. 600 ml. of a solution containing 152 g. (=0.6 mol) of choline bitartrate were obtained.

EXAMPLE 2

A solution of 126 g. (=0.6 mol) of monohydrated citric acid dissolved in 600 ml. of water were passed over a column of "Amberlite IRC-50" saturated with 0.6 equivalent of choline, as in Example 1.

The procedure was as in Example 1, and 600 ml. of a solution containing 177 g. (=0.6 mol) of monocholine citrate (pH=4.2) were collected and then concentrated and dried.

EXAMPLE 3

1440 ml. of a solution containing 190 g. (=0.36 mol) of calcium glucoheptonate with two molecules of water (molecular weight=526.3) were passed with a flow-rate of 400 ml. per hour over a column of "Amberlite IRC-50," saturated with 0.6 equivalent of choline as in Example 1, and then the resin was washed with 400 ml. of water.

The effluent was collected in three fractions; the first 200 ml., comprising water, were rejected. 1370 ml. of choline glucoheptonate solution free from chloride were then collected, followed by 300 ml. of a solution comprising a mixture of choline glucoheptonate and calcium glucoheptonate. This latter fraction was recycled. The choline glucoheptonate solution was concentrated and dried in vacuo. 116 g. of anhydrous product were obtained.

EXAMPLE 4

2700 ml. of a 0.25 N choline chloride solution containing 94.2 g. of choline chloride were passed at a rate of flow-rate of 2-litres per hour over a column charged with 1 litre of the resin "Amberlite IRA-68" previously converted to the bicarbonate form. The first 300 ml. of the effluent were discarded. After passage of the solution, the resin was washed with 500 ml. of water; a total of 2.9 litres of solution containing 0.67 mol of choline bicarbonate and 10 p.p.m. of chloride were collected. The solution thus obtained was then introduced into a 5 litre reactor provided with a fritted glass bottom serving for the dispersion of compressed air and charged with 180 ml. of the resin "Amberlite IRC-84" in hydrogen form. The liberation of carbon dioxide gas commenced immediately and the bed was kept in the fluidized state by injection of compressed air for 4 hours. The resin was then allowed to decant, the supernatant solution was emptied to the upper level of the resin, and the latter was washed until chloride no longer occurred in the effluent. The effluent solution contained 0.060 mol of choline bicarbonate; it was recycled. After several recyclings, the impure solution enriched with amines was rejected.

On conversion from the hydrogen form to the choline from "Amberlite IRC-84" underwent considerable swelling and its volume increased from 180 ml. to 405 ml. On saturation it had fixed 0.61 mol of choline, which corresponds to a fixation capacity of 3.4 gram equivalents of choline per litre of resin, measured in hydrogen form.

In order to prepare choline bitartrate, 90 g. (=0.6 mol) of l-tartaric acid were dissolved in 600 ml. of water and the solution passed over the resin with a flow-rate of 400 ml. per hour, followed by rinsing with water. The first 200 ml. of effluent were discarded; 600 ml. of a solution containing 152 g. (=0.6 mol) of choline bitartrate were collected.

EXAMPLE 5

The solution of choline bicarbonate obtained in accordance with Example 1 was passed over 260 ml. of "Amberlite IRC-50" in hydrogen form. The fixing of the choline was effected in accordance with Example 1; a residual solution containing 0.06 mol of choline bicarbonate was obtained, which corresponds to the fixing of 0.60 mol of choline on the resin. On conversion, the "Amberlite IRC-50" underwent a very considerable increase in volume, of the order of +84%. Its exchange capacity on saturation is 2.3 gram equivalents per litre of resin, measured in hydrogen form.

After the resin had been washed, a solution of 126 g. (=0.6 mol) of monohydrated citric acid dissolved in 600 ml. of water was passed.

The procedure was as in Example 1, and 600 ml. of a solution containing 177 g. (=0.6 mol) of monocholine citrate having a pH of 4.2 was collected, which was then concentrated and dried.

EXAMPLE 6

4300 ml. of a 0.20 N choline chloride solution, containing 60 g. of choline chloride, was passed with a flow-rate of 2 litres per hour over a column charged with 1 litre of "Amberlite IRA-68," previously converted to the bicarbonate form, and the resin was then washed with 500 ml. of water. A total of 4.5 litres of the solution containing 0.85 mol of choline bicarbonate and 0.004 mol of choline chloride was collected.

This solution was passed over 300 ml. of "Amberlite IRC-84" in hydrogen form. At the end of 2 hours fixing was complete; the supernatant solution contained only traces of bicarbonate and all the choline chloride.

After the resin had been washed, the solution of 0.85 mol (=166.7 g.) of gluconic acid in 800 ml. of water was passed over the resin. The procedure was as in Example 1, and 800 ml. of a solution containing 254 g. of choline gluconate were collected.

What is claimed is:
1. A method for producing a choline salt of a hydroxy organic carboxylic acid selected from the group consisting of tartaric acid, citric acid, glutamic acid, gluconic acid and glucoheptonic acid from choline chloride comprising the steps of:
   passing the choline chloride in aqueous solution over a strongly basic anion exchange resin in the hydroxide form, so as to obtain a solution of choline containing choline chloride as an impurity;
   passing said solution over the hydrogen form of a weakly acidic cation exchange resin to fix the choline thereon;
   washing said cation exchange resin with water until no further chloride ion appears in the effluent;
   and eluting the choline from the cation exchange resin with an aqueous solution of said acid.
2. A method according to claim 1, wherein the choline is eluted from the cation exchange resin with an aqueous solution of an alkaline earth metal salt of the aforesaid hydroxy organic carboxylic acid.
3. A method according to claim 2, wherein the alkaline earth metal is calcium.
4. A method according to claim 1, wherein the concentration of the initial solution of choline chloride is between 0.05 and 2.0 N.
5. A method according to claim 1, wherein the concentration of the initial solution of choline chloride is between 0.1 and 0.5 N.
6. A method according to claim 1, wherein the initial solution of choline chloride contains aminated impurities, and an excess, referred to the exchange capacity of the resin, of the choline solution is run into the cation exchange resin.
7. A method according to claim 1, wherein the cation exchange resin is disposed in two column connected in series.
8. A method of producing a choline salt of a hydroxy organic carboxylic acid selected from the group consisting of tartaric acid, citric acid, glutamic acid, gluconic acid and glucoheptonic acid from choline chlorde, comprising the steps of:
   passing the choline chloride in aqueous solution over a weakly basic anion exchange resin in the bicarbonate form, so as to obtain an aqueous solution of choline bicarbonate containing choline chloride as an impurity;
   passing said solution over the hydrogen form of a weakly acidic cation exchange resin to fix the choline thereon;
   washing said cation exchange resin with water until no further chloride ion appears in the effluent;
   and eluting the choline from the cation exchange resin with an aqueous solution of said acid.
9. A method according to claim 8, wherein the choline is eluted from the cation exchange resin by an aqueous solution of an alkaline earth metal salt of the aforesaid hydroxy organic carboxylic acid.
10. A method according to claim 9, wherein the alkaline earth metal is calcium.
11. A method according to claim 8, wherein the concentration of the initial solution of choline chloride is between 0.05 and 2.0 N.
12. A method according to claim 8, wherein the concentration of the initial solution of choline chloride is between 0.1 and 0.5 N.
13. A method according to claim 8, wherein the initial solution of choline chloride contains aminated impurities, and an excess, referred to the exchange capacity of the resin, of the choline solution is run into the cation exchange resin.
14. A method according to claim 8, wherein the cation exchange resin is disposed in two columns connected in series.

References Cited

UNITED STATES PATENTS 2,677,670   5/1954   Kunin et al. _____ 260—2.2

FOREIGN PATENTS 906,409   9/1962   Great Britain.
721,565   4/1955   Great Britain.
695,968   8/1953   Great Britain.

OTHER REFERENCES

Berggren et al.: Acta Chemica Scandinavica, vol. 11, No. 1, p. 206.

BERNARD HELFIN, Primary Examiner

M. W. GLYNN, Assistant Examiner

U.S. Cl. X.R.

260—501.15, 567.6